(12) United States Patent
Culbertson et al.

(10) Patent No.: US 12,031,875 B2
(45) Date of Patent: Jul. 9, 2024

(54) RESISTANCE CALIBRATION AND MONITORING OF THERMAL SYSTEMS

(71) Applicant: WATLOW ELECTRIC MANUFACTURING COMPANY, St. Louis, MO (US)

(72) Inventors: David P. Culbertson, Bristol, WI (US); Steven T. Jystad, St. Louis, MO (US); Roger Brummell, Hannibal, MO (US); Sanhong Zhang, Ballwin, MO (US); Jeremy Ohse, St. Louis, MO (US); Pete Koss, St. Louis, MO (US); Austin Johannes, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 389 days.

(21) Appl. No.: 17/225,345

(22) Filed: Apr. 8, 2021

(65) Prior Publication Data
US 2021/0318177 A1 Oct. 14, 2021

Related U.S. Application Data

(60) Provisional application No. 63/007,272, filed on Apr. 8, 2020.

(51) Int. Cl.
*G01K 7/18* (2006.01)
*G01K 7/16* (2006.01)
*G01K 19/00* (2006.01)

(52) U.S. Cl.
CPC ....... *G01K 7/183* (2013.01); *G01K 2007/163* (2013.01); *G01K 19/00* (2013.01)

(58) Field of Classification Search
CPC .. G01K 7/183; G01K 19/00; G01K 2007/163; G01K 15/005
(Continued)

(56) References Cited

U.S. PATENT DOCUMENTS

| 4,901,257 A | * | 2/1990 | Chang | G05D 23/24 324/714 |
| 10,316,644 B2 | * | 6/2019 | Harris | E21B 47/07 |

(Continued)

FOREIGN PATENT DOCUMENTS

| CN | 103229032 A | * | 7/2013 | G01K 11/06 |
| GB | 2562506 A | * | 11/2018 | |

(Continued)

OTHER PUBLICATIONS

Thermophysical properties of Ni-containing single-phase concentrated solid solution alloys☆ K. Jin a, S.Mua, K. Anb, W.D. Porter a, G.D. Samolyuka, G.M. Stocks a, H. Bei a, Materials and Design 117 (2017) 185-192 (Year: 2017).*

(Continued)

*Primary Examiner* — Natalie Huls
(74) *Attorney, Agent, or Firm* — Burris Law, PLLC

(57) ABSTRACT

A method of calibrating temperature of a resistive element having a material with a Curie temperature includes generating a standard resistance-temperature (R-T) curve for the resistive element in isothermal conditions to identify values of the R-T curve and an inflection point at the Curie temperature, generating operational R-T curves for the resistive element over an operational time period, comparing the standard R-T curve to the operational R-T curves, and adjusting the operational curves to the standard R-T curve at the Curie temperature to calibrate temperature of the resistive element.

10 Claims, 23 Drawing Sheets

(58) Field of Classification Search
USPC .......................................................... 374/185
See application file for complete search history.

(56) References Cited

U.S. PATENT DOCUMENTS

| | | | |
|---|---|---|---|
| 10,883,885 B2 * | 1/2021 | Kurz .................... | G01K 15/002 |
| 2012/0051389 A1 * | 3/2012 | Schalles ............... | G01K 15/002 |
| | | | 374/1 |
| 2016/0353521 A1 * | 12/2016 | Reynolds ................. | H05B 3/06 |
| 2019/0360876 A1 | 11/2019 | Korn et al. | |
| 2019/0360877 A1 * | 11/2019 | Schalles .................. | G01K 7/36 |
| 2020/0163386 A1 * | 5/2020 | Courbat ................... | H05B 3/22 |

FOREIGN PATENT DOCUMENTS

| | | | |
|---|---|---|---|
| SU | 1275232 | | 12/1986 |
| SU | 1275232 A1 * | | 12/1986 |
| TW | 200906232 A | | 2/2009 |

OTHER PUBLICATIONS

International Search Report for International Application No. PCT/US2021/026339, dated Sep. 13, 2021.
Search Report issued in corresponding TW Application No. 110112803, dated Apr. 20, 2022, 1 page.

* cited by examiner

For a multi-coil heater, use different materials with different Curie Points and calibrate at more than 1 temperature

RESISTANCE CALIBRATION AND MONITORING OF THERMAL SYSTEMS

CROSS-REFERENCE TO RELATED APPLICATION

This application claims priority to and the benefit of U.S. Provisional Application No. 63/007,272, filed on Apr. 8, 2020. The disclosure of the above application is incorporated herein by reference.

FIELD

The present disclosure relates to temperature measurements, and more specifically to calibrating the temperature of a resistive heater based on resistance measurements.

BACKGROUND

The statements in this section merely provide background information related to the present disclosure and may not constitute prior art.

It is known in the art to use resistance measurements of resistive heaters to calculate temperature rather than, or in addition to, using a discrete temperature sensor. However, the resistance of heating elements within the resistive heater often shift over time or during manufacturing, causing errors in the calculated temperature versus the actual temperature.

A variety of calibration techniques may be employed to compensate for these resistance changes and correct to a more accurate temperature, including the use of multiple thermocouples to compare the calculated temperature to the measured temperature and then applying appropriate corrections to the resistance calculations. Although somewhat effective, these calibration techniques have drawbacks in terms of their complexity and accuracy.

These issues related to the calibration of resistance of heating/resistive elements over time, among other issues related to the control of heating/resistive elements, are addressed by the present disclosure.

SUMMARY

This section provides a general summary of the disclosure and is not a comprehensive disclosure of its full scope or all of its features.

Generally, the present disclosure uses the inflection point/area on a resistance-temperature (R-T) curve at the Curie temperature when a resistive heater (or sensor, or other resistive element) is in use, which provides a known temperature signal that can be used for calibration. As described in greater detail below, this inflection point or calibrated R-T curve can be used for a variety of purposes, including but not limited to, predicting remaining life for a heater, measurement of the temperature profile along the length of a heater (or sensor, or other resistive element), identification of thermal losses from a heating system to improve system modeling and control, improvement in identification of the thermal path between the heating element and the process to improve system modeling and control, reduction of cost to calibrate thermal systems, self-calibration of heating systems, increased level of precision for combined two-wire resistance and thermocouple power pin (TCPP) thermal systems, two-wire thermocouple junction systems (to include other thermal systems having temperature sensing resistive/lead wires), and field re-calibration for sensing systems that change over time. Accordingly, the term "power lead" should be construed to mean a power pin, a lead wire, or other conductive element that is operatively connected to a resistive element in order to provide power thereto.

It should also be understood that the teachings herein may be applied alone or in combination with other calibration techniques, whether known or a part of the inventive content herein, while remaining within the scope of the present disclosure.

In one form, a method of calibrating temperature of a resistive element having a material with a Curie temperature is provided. The method comprises generating a standard resistance-temperature (R-T) curve for the resistive element in isothermal conditions to identify R-T curve values and an inflection point at the Curie temperature, generating operational R-T curves for the resistive element over an operational time period, comparing the standard R-T curve to the operational R-T curves, and adjusting (both offset and gain) the operational curves to the standard R-T curve at the Curie temperature.

In one form, the resistive element is in a heater, but the resistive element may also be a sensor, such as a thermocouple, among other resistive elements. In another form, the resistive element is coupled to a power lead at a junction, the power lead being a different material than the material of the resistive element such that a second calibration temperature is determined at the junction.

In another form, a multi-point calibration is achieved when the resistive element is electrically coupled to power leads having different materials and a thermocouple junction, where at least one power lead is connected to the resistive element. This method comprises generating a standard resistance-temperature (R-T) curve for the resistive element in isothermal conditions to identify values of the R-T curve and an inflection point at the Curie temperature, generating operational R-T curves for the resistive element over an operational time period, comparing the standard R-T curve to the operational R-T curves, adjusting the operational curves to the standard R-T curve at the Curie temperature, calculating a temperature at the junction, and calculating a revised temperature of the resistive element based on the adjusting step and the temperature at the junction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
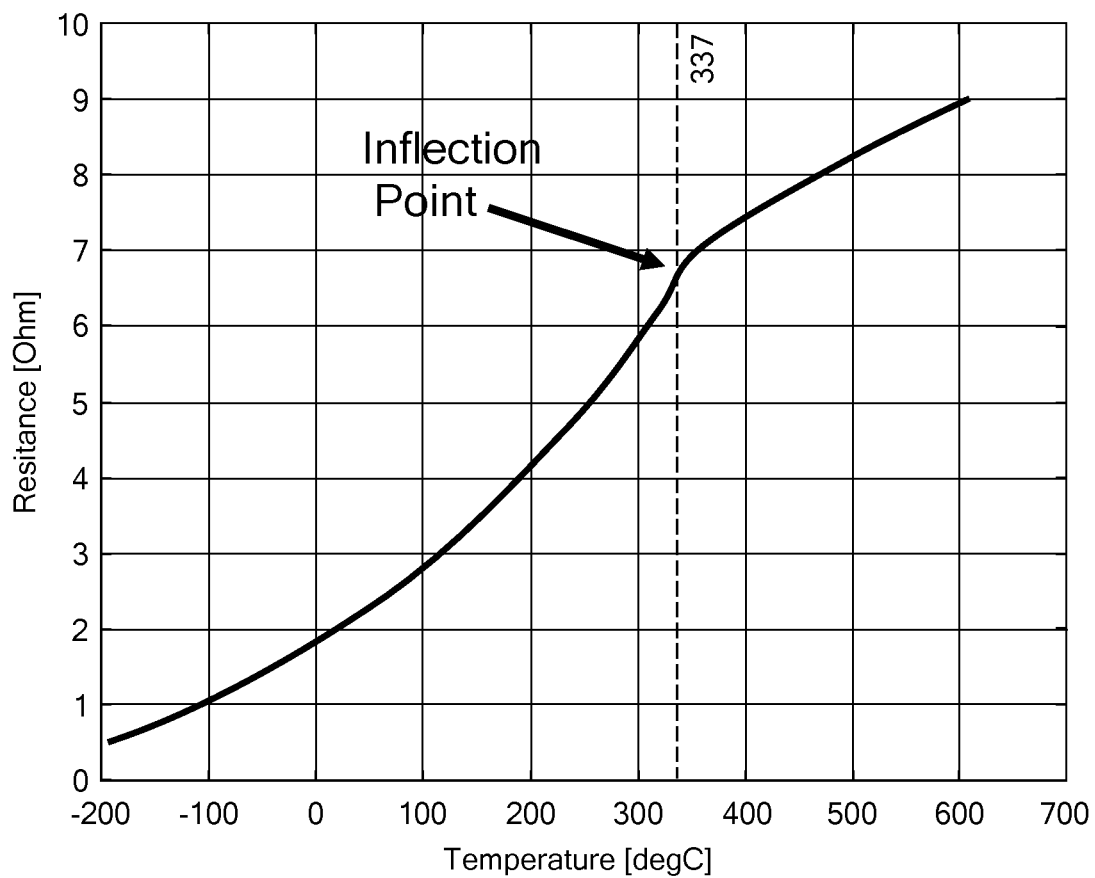
FIG. 1 is a graph illustrating an inflection point at a Curie temperature of a resistive material on a resistance vs temperature (R-T) curve.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The Curie temperature, or Curie point, is known in physics and materials science as the temperature above which certain materials lose their permanent magnetic properties. As shown in FIG. 1, the Curie temperature has been shown to create an inflection point on the Resistance-Temperature (R-T) characteristic of some materials, including by way of example Nickel, Iron, Cobalt and some of their alloys.

Figure 2:
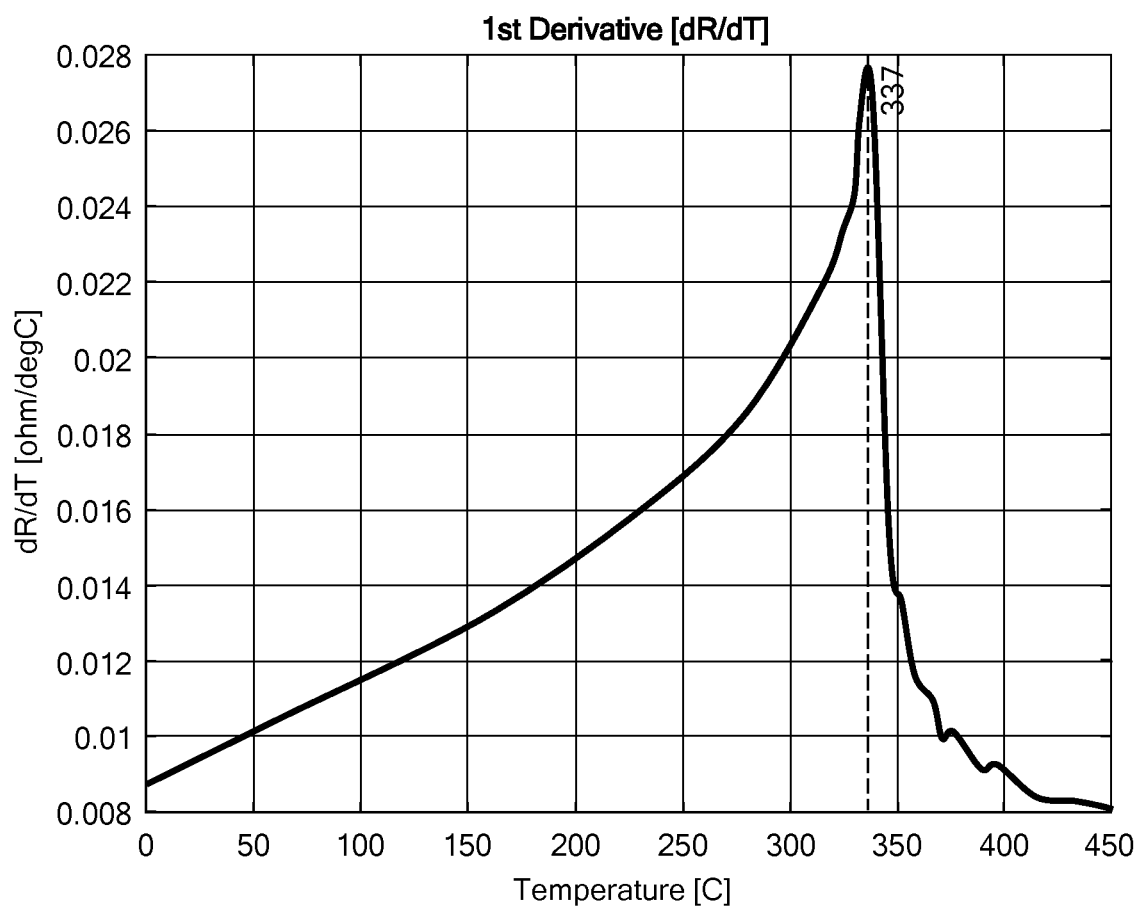
FIG. 2 is a graph illustrating an inflection point at a Curie temperature of a resistive material on a change in resistance (dR/dT) vs temperature curve.

Referring to FIG. 2, the inflection point can be more clearly identified by measuring the rate of change of resistance with temperature (or rate of change with time when crossing the inflection point), or dR/dT. The inventors have discovered that the inflection point remains mostly unaffected by shifts in resistance due to manufacturing processes and time in use. In other words, the inflection point generally remains at the same temperature regardless of operational environment/constraints and physical construction of the heater/thermal system. Therefore, by identifying the inflection point when a resistive heater (or sensor, or other resistive element) is in use, a known temperature signal is provided that can be used for calibration. As described herein, this principle discovery by the inventors can be applied in a variety of cases to more easily and more accurately determine temperature at and along a resistive element, to calibrate thermal models, to self-calibrate a resistive element, for life prediction of a resistive element, and to control power to a thermal system, among other uses.

Figure 3:
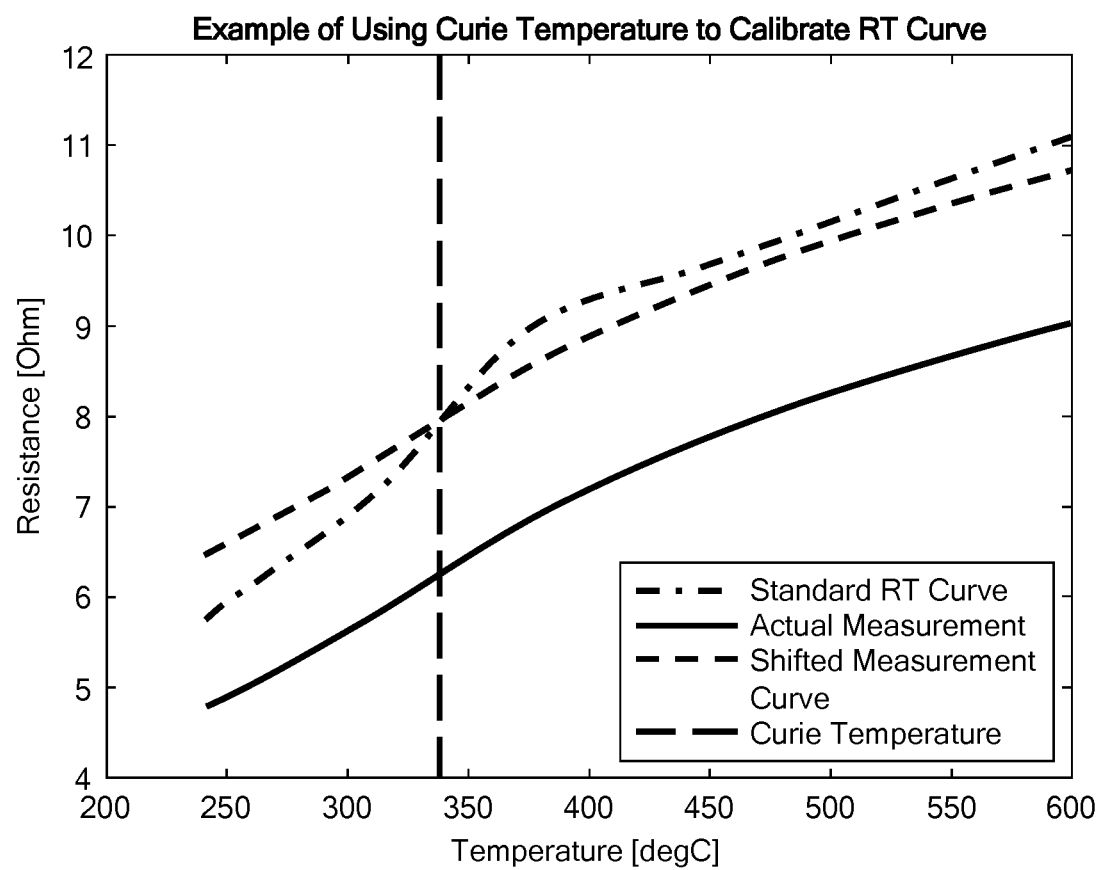
FIG. 3 is a graph illustrating a shifted R-T curve to calibrate the resistance of a resistive element according to the teachings of the present disclosure.

Referring now to FIG. 3, an example of using the Curie temperature to calibrate an R-T a standard R-T curve, or one that is generated under isothermal conditions is shown for a resistive element, along with an actual measured, or operational, R-T curve having errors. Because the inflection point at the Curie temperature does not change, the operational R-T curve can be offset or shifted up as shown to the standard R-T curve at the Curie temperature, in order to calibrate the R-T curve of the resistive element.

Figure 4:
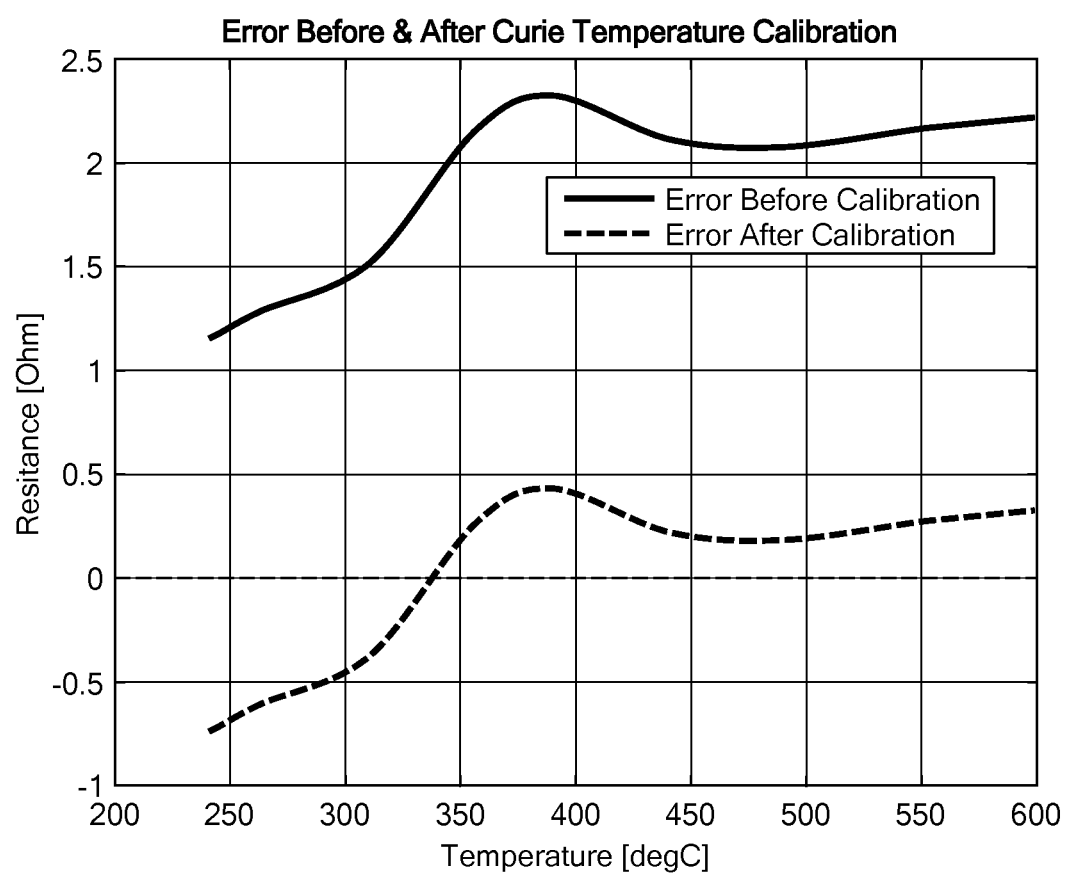
FIG. 4 is a graph illustrating error before and after the calibration shown in FIG. 3.

As shown in FIG. 4, this shifting of the R-T curve reduces errors in the resistance measurements, and thus the resistance of the resistive element over a temperature range can be easily and accurately calibrated according to the principles of the present disclosure.

Referring back to FIG. 3, the operational R-T curve is generally more "flat" than the standard R-T curve. This occurs because the ends of the resistive element are at a lower temperature than the middle of the resistive element and thus the flatter curve indicates an average temperature of the overall resistive element because of this temperature differential. With the shifting of the R-T curve having the inflection point, the teachings of the present disclosure may be applied to determine a temperature profile along a length of the resistive element. In one example, note that with the calibrated R-T curve, the resistance at the lower temperatures is actually lower than the calculated resistance, while the calibrated resistances at the higher temperatures generally track the standard R-T curve but are somewhat higher. More specific examples and testing are described in greater detail below.

Testing/Calculations

Figure 5:
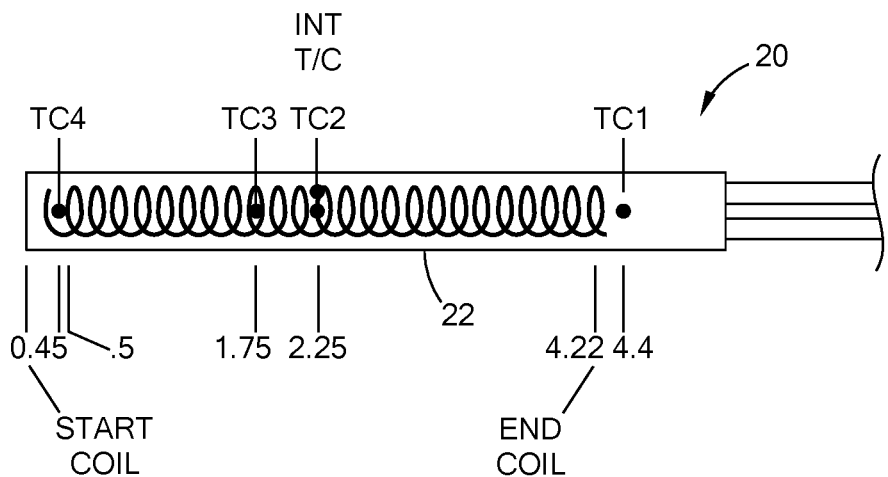
FIG. 5 is a schematic side view of a resistive heater having a plurality of thermocouples used in testing according to the teachings of the present disclosure.
Figure 6:
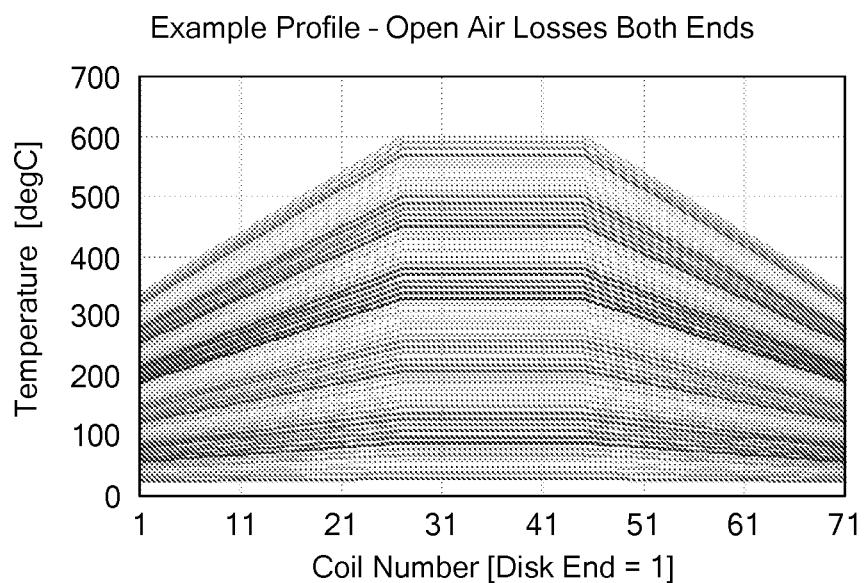
FIG. 6 is a graph of simulated temperature distributions at different power levels along the length of the resistive heater of FIG. 5.

Referring to FIGS. 5 and 6, testing was conducted on a tubular heater 20 having a resistive wire with 71 coils, an internal thermocouple located at the center of the heater 20, and four (4) additional thermocouples attached to the sheath 22 of the heater 20 as shown and labeled TC1 through TC4. The temperature profiles along the length of the heater 20 are shown in FIG. 6, over a temperature range from 0-600° C., in which it can be observed that heat losses occur at the ends of the heater 20 as the temperature was increased.

Figure 7:
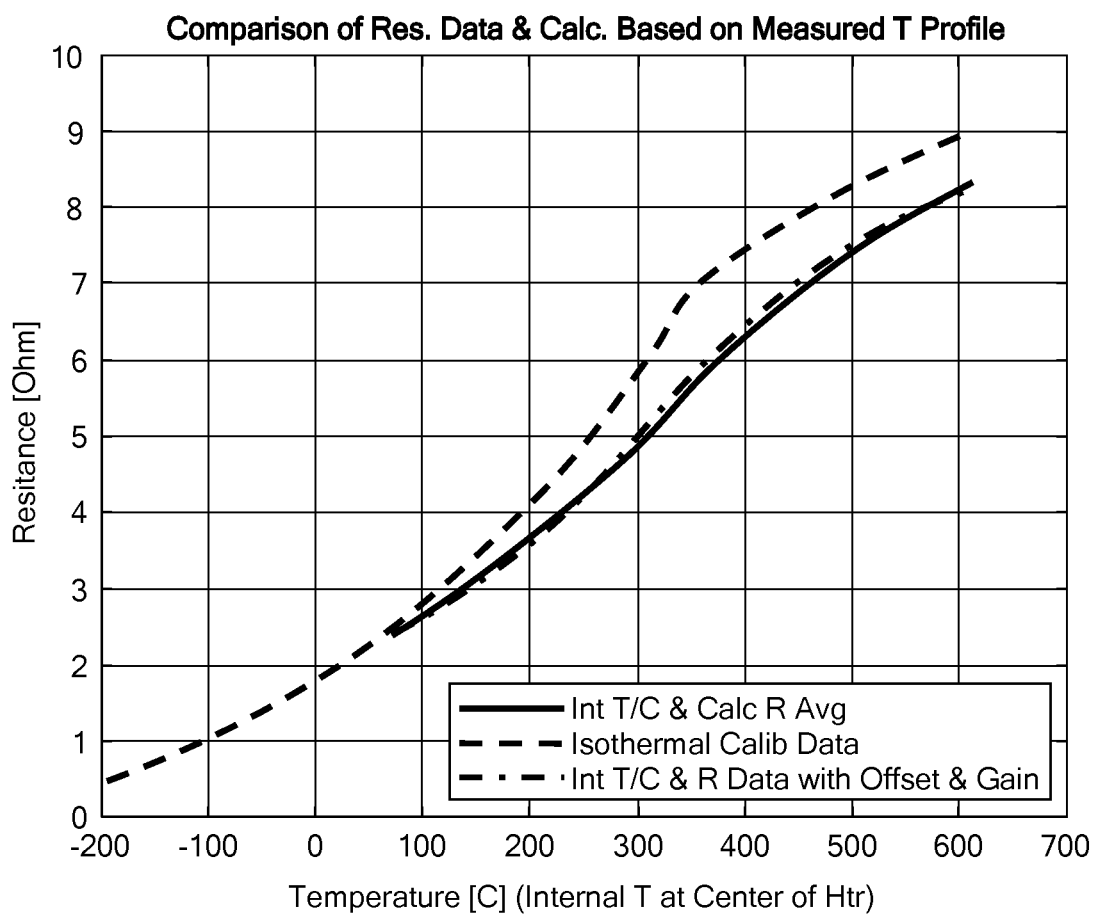
FIG. 7 is a graph of an operational R-T curve, which has been calibrated using both a slope and offset compared to a standard R-T curve according to testing of the present disclosure.

Now, referring to FIG. 7, two resistive elements were tested, one in isothermal conditions as shown by the upper dashed curve, and one in open air as shown by the lower dashed curve. The open air curve has been adjusted for offset and gain to allow comparison of the curves. Finally, the lower solid curve applies the isothermal resistivity data to the measured temperature profile. As a result, the similarity in curvature of the lower dashed curve and the solid curve indicates efficacy of the calibration technique, thus reducing errors caused by the "flatness" of the curve as set forth below.

Generally, the "flatness" of the measured R-T curve compared with an isothermal R-T curve can provide calibration information concerning the temperature profile along the length of the resistive element. As used herein, the term "flatter" should be construed to mean having less distinctive inflection points or areas, or a curve having a relatively consistent slope. The term "flatter" should not be construed to mean closer to horizontal on a Cartesian plane. For example, the flatter the curve, the more thermal losses that are likely occurring at the ends of the resistive element. By offsetting the isothermal R-T curve at the Curie temperature, these losses can be compensated for, similar to losses due to manufacturing variances and shifts in resistance of the resistive element over time.

Figure 8A:
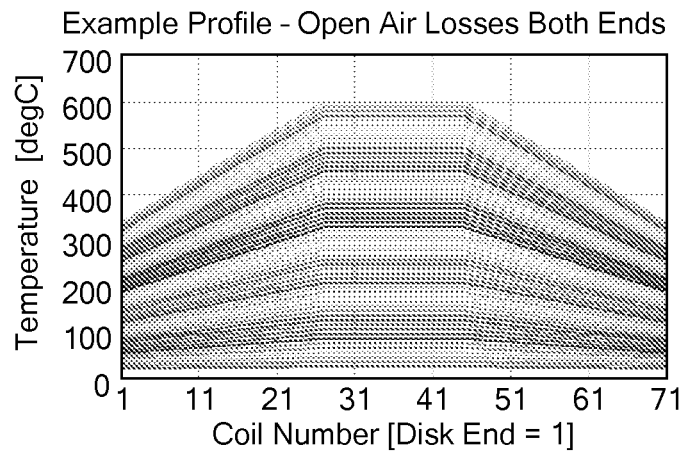
FIGS. 8A-8C are graphs of simulated temperature distributions along the length of the resistive heater of FIG. 5 at different power levels, with different thermal end conditions.
Figure 8B:
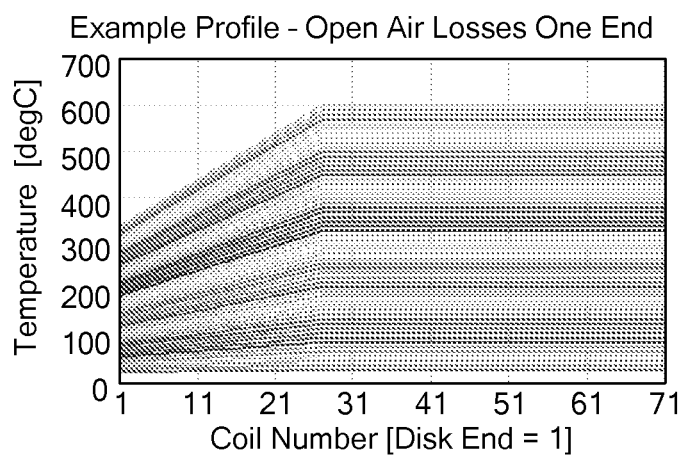
Figure 8C:
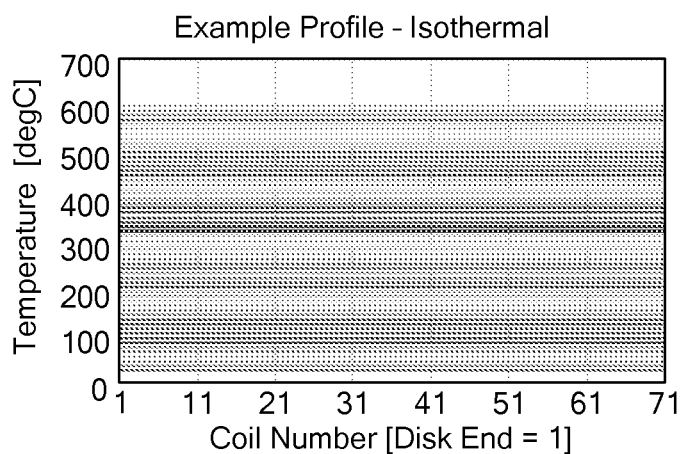
Figure 9:
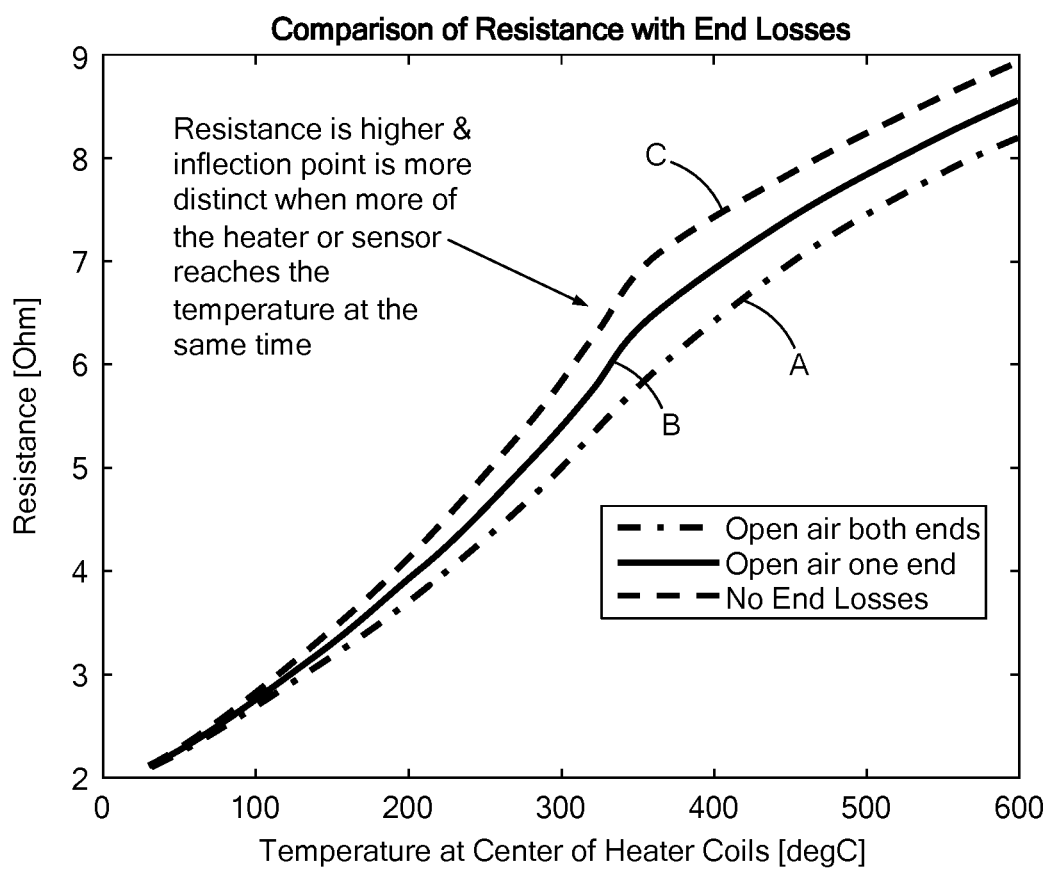
FIG. 9 is a graph of calculated R-T curves for the different thermal end conditions of FIGS. 8A-8C.

Referring to FIGS. 8A-8C and 9, this principle of calibration for temperature profile along the length of the resistive element using simulated data is illustrated in greater detail. FIGS. 8A-8C show a number of temperature measurements with discrete thermocouples as set forth above for a resistive element having open air losses at both ends (FIG. 8A), open air losses at one end (FIG. 8B), and an isothermal temperature profile (FIG. 8C). Corresponding R-T curves are shown in FIG. 9, with curve A representing open air losses at both ends, curve B representing open air losses at one end, and curve C representing the isothermal case. As shown, with the isothermal case in curve C, the resistance is higher and the inflection point is more distinct when more of the resistive element reaches temperature at the same time. With greater thermal losses, which in this example are at the end portions, the inflection points are less distinct ("flatter").

Figure 10:
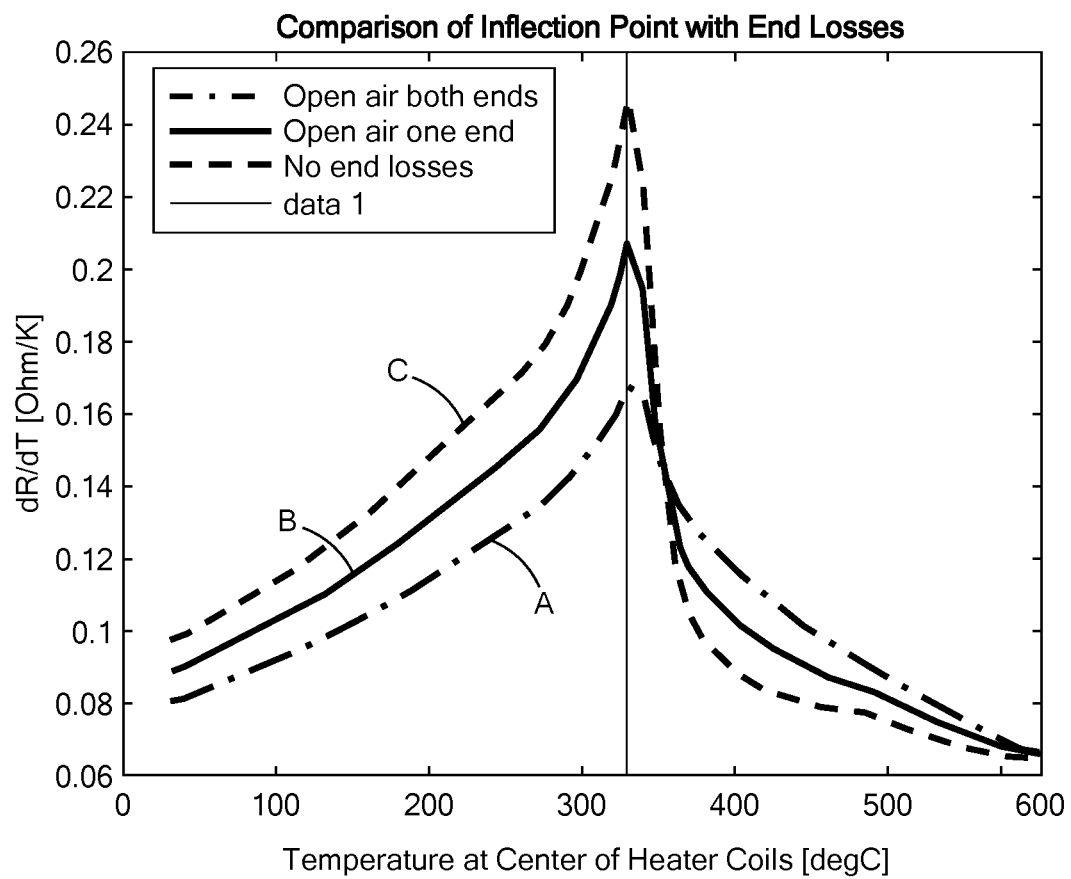
FIG. 10 is a graph of calculated dR/dT curves for the different thermal end conditions of FIGS. 8A-8C.

Referring now to FIG. 10, the first derivative of resistance over temperature, or the change in resistance over the change in temperature (dR/dT), highlights these differences with and without thermal end losses. As shown by curve C, the maximum dR/dT point is higher when more of the resistive element reaches the inflection point temperature at the same time and reduces very quickly at higher temperatures. As shown by curves B and C, the maximum dR/dT point is lower when less of the resistive element reaches the inflection point temperature at the same time and reduces at a slower rate at higher temperatures (since other portions of the material are still near the inflection point). Notably, in spite of these differences, the inflection point (or Curie temperature) remains the same for all three (3) conditions, thus providing a constant for calibration of resistive element resistance in a variety of thermal environments.

Salt Bath Testing

To further demonstrate the use of the Curie temperature for resistance calibration, a series of tests were conducted with resistive elements immersed in a 420° C. molten salt bath (to simulate isothermal conditions). The resistive elements were both partially immersed in the salt bath and fully immersed in the salt bath and data was collected for these two test conditions.

Figure 11A:
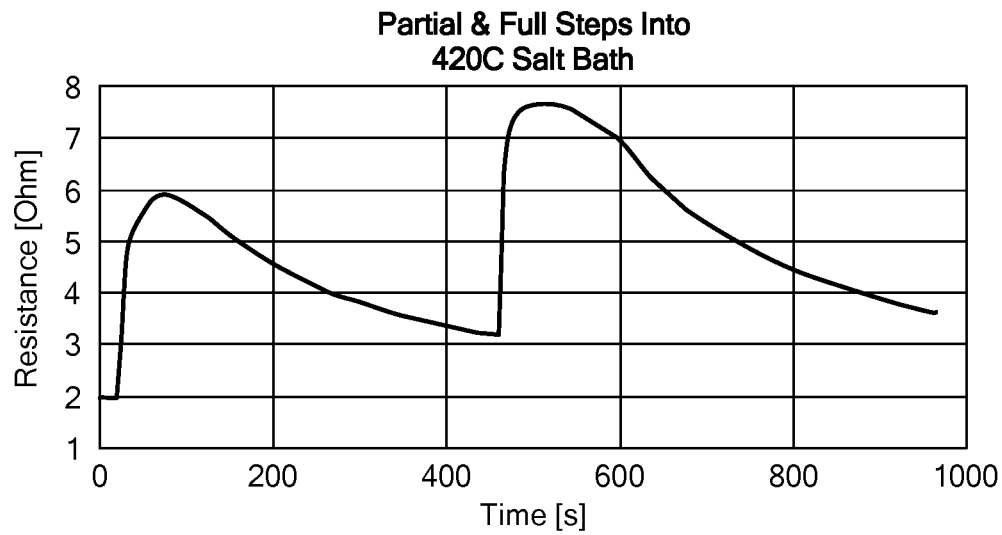
FIGS. 11A-11B are graphs of the resistance and change of resistance over time of a resistive element in an isothermal salt bath, for both partial and full immersion, according to testing of the present disclosure.
Figure 11B:
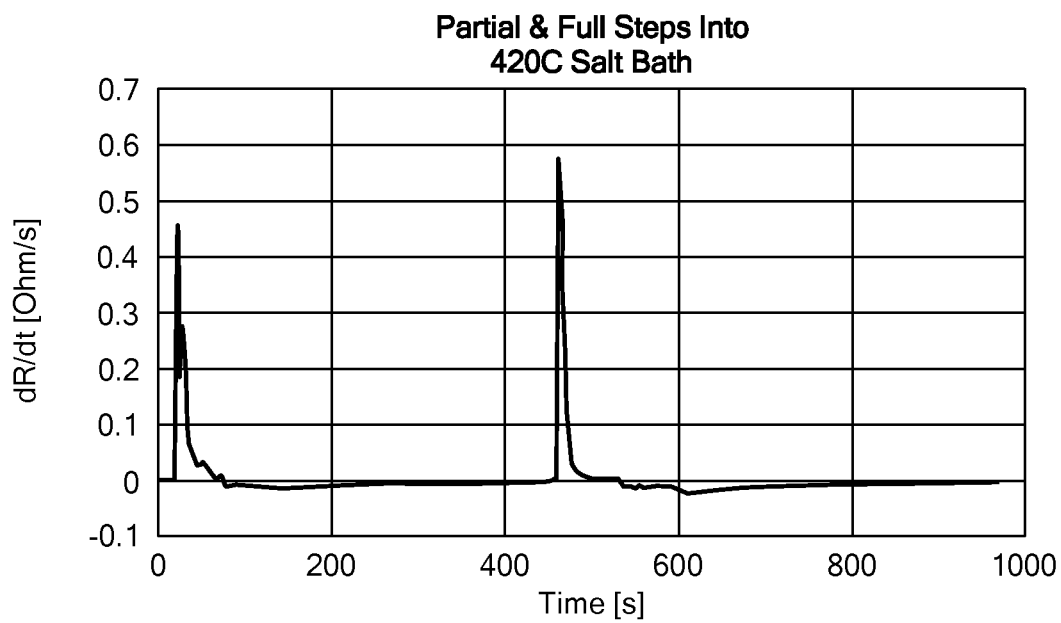

As shown in FIGS. 11A and 11B, the resistive element was partially immersed in the salt bath, removed from the bath and cooled at room temperature, followed by being fully immersed in the salt bath and cooled at room temperature.

Figure 12A:
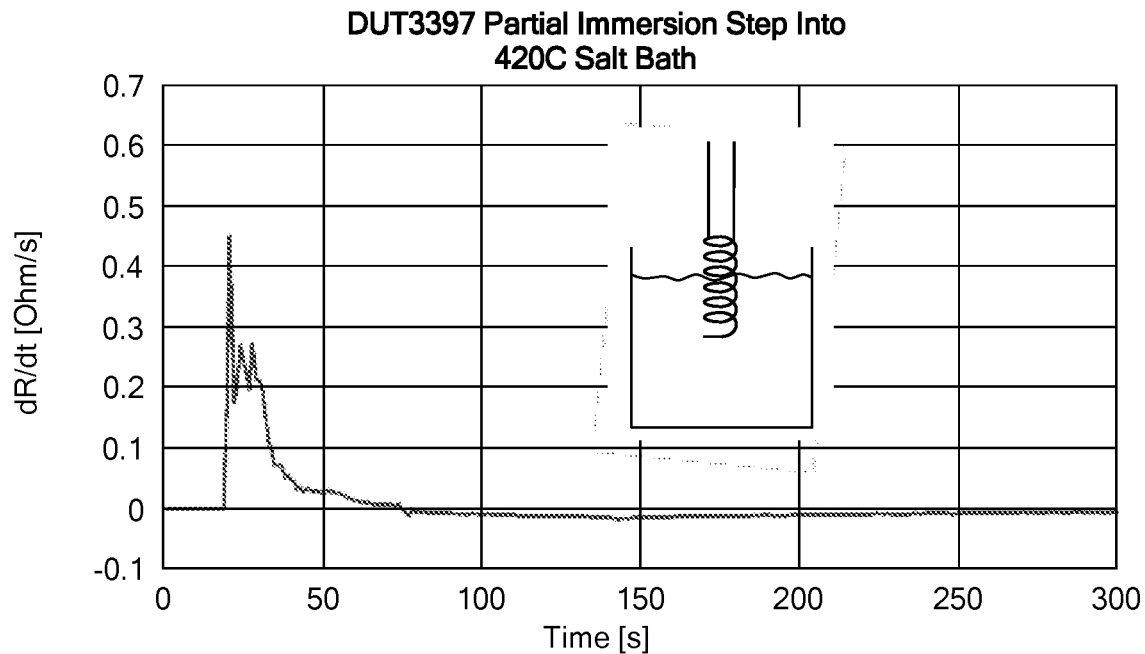
FIGS. 12A-12C are graphs illustrating the change in resistance over time for the partial immersion salt bath over an entire heating cycle, a heating ramp, and a cooling ramp according to testing of the present disclosure.
Figure 12B:
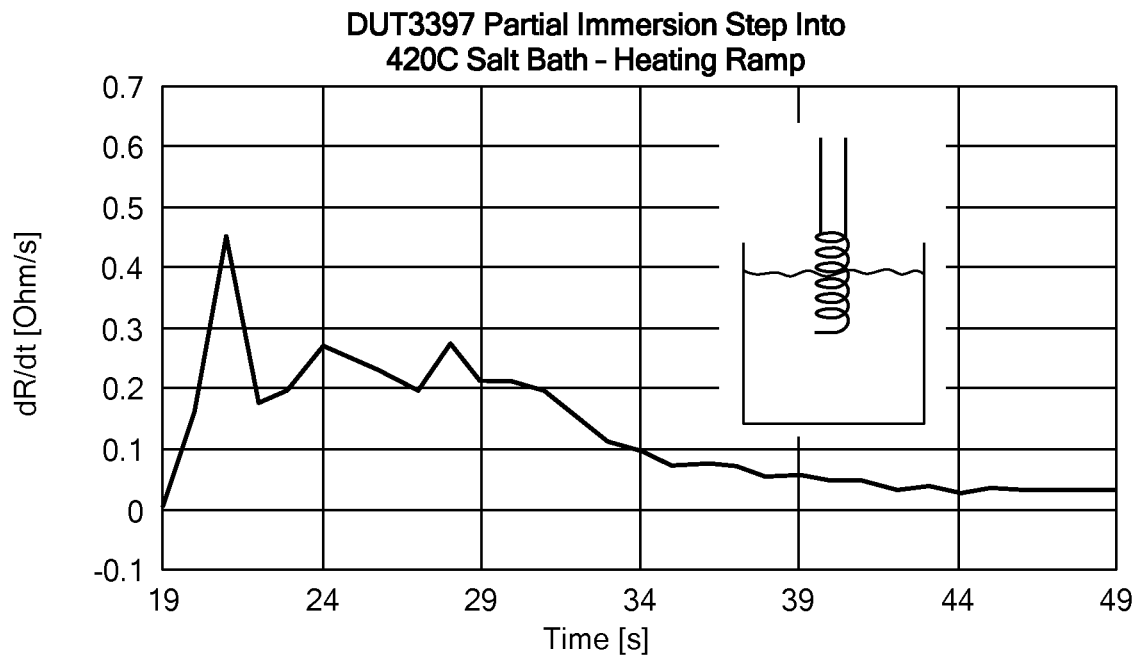
Figure 12C:
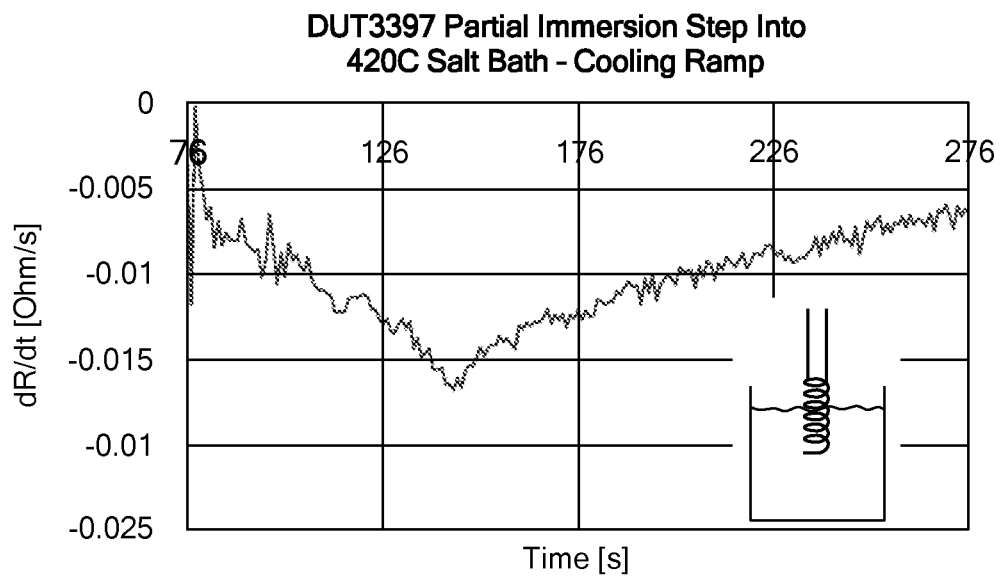
Figure 13A:
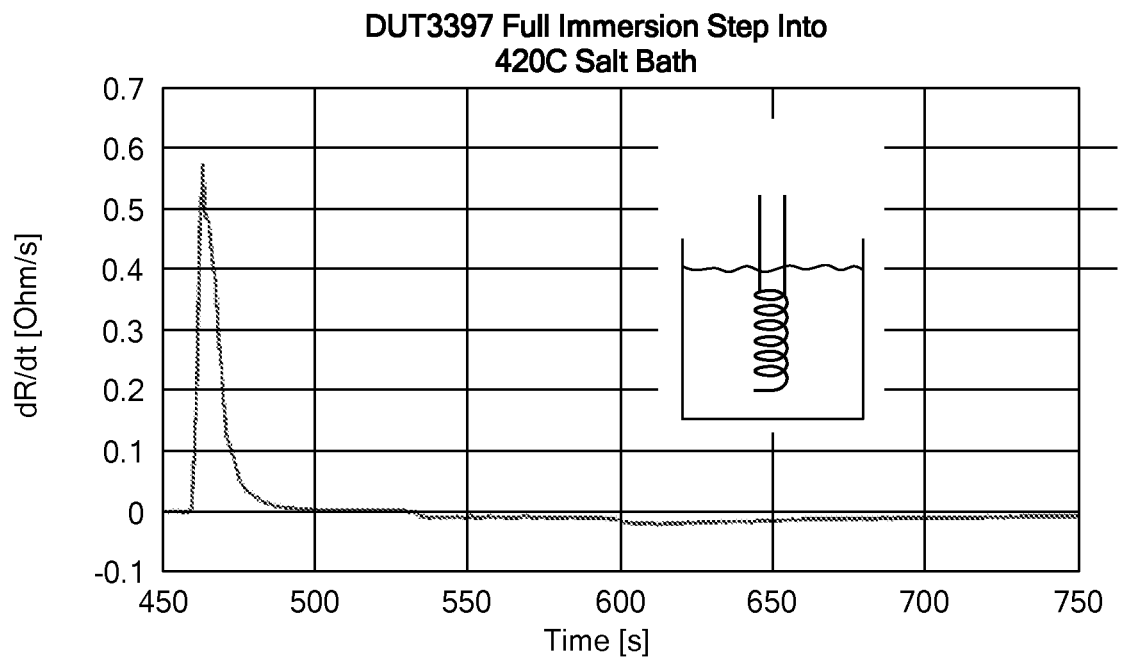
FIGS. 13A-13C are graphs illustrating the change in resistance over time for the full immersion salt bath over an entire heating cycle, a heating ramp, and a cooling ramp according to testing of the present disclosure.
Figure 13B:
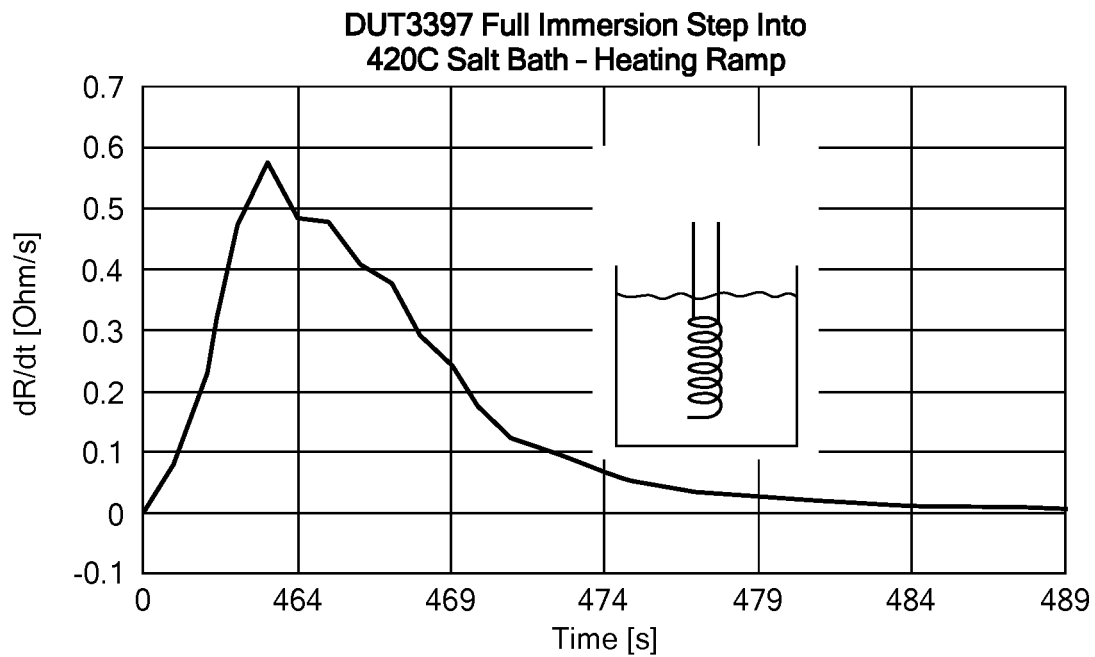
Figure 13C:
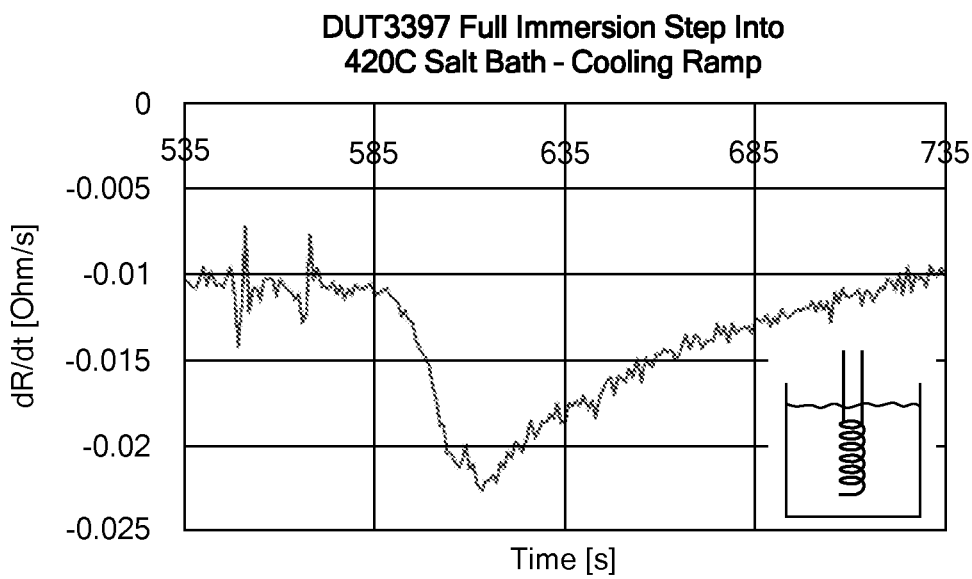
Figure 14A:
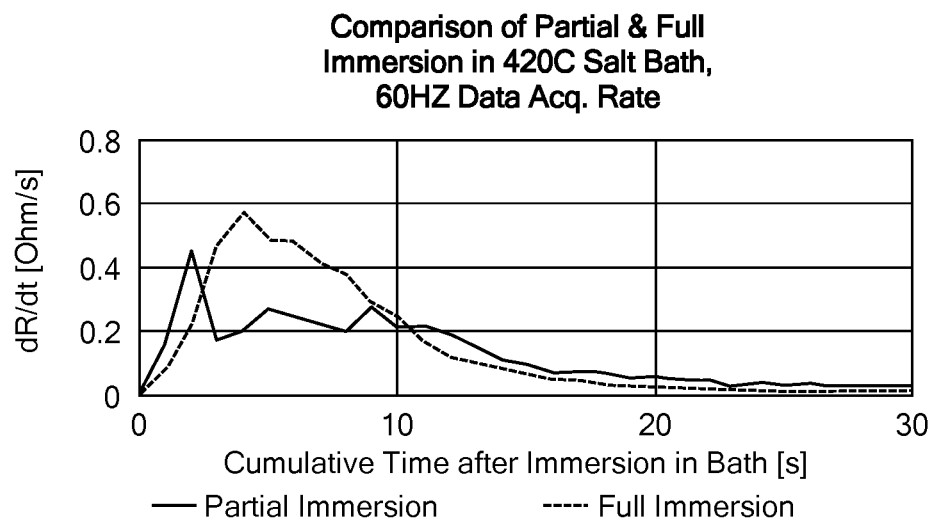
FIGS. 14A-14B are graphs illustrating the change in resistance over time for both the partial and full immersion salt bath over a cumulative time period and after removal from the salt bath according to testing of the present disclosure.
Figure 14B:
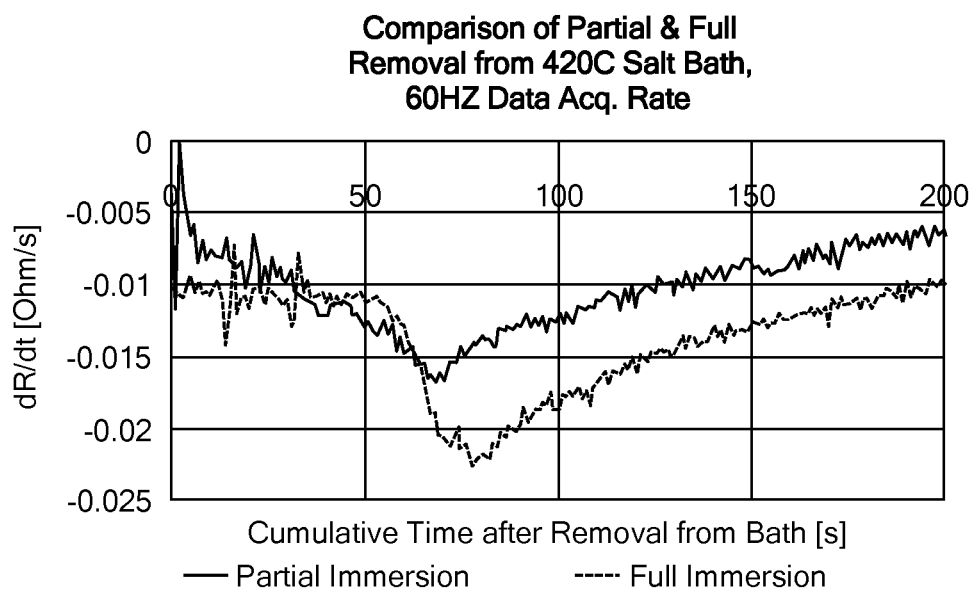

As further shown in FIGS. 12A-12C for partial immersion, and FIGS. 13A-13C for full immersion, a number of observations were made. First, the magnitude of the dR/dt (change in resistance over the change in time, time="t") was higher for the fully immersed test condition. Also, the magnitude of the dR/dt was higher for the fully immersed test condition during both the heating ramp/period and the cooling ramp/period. This difference in the magnitude of dR/dt during the heating ramp/period and the cooling ramp/period is also shown in FIGS. 14A and 14B.

Self-Calibration

Yet another application of the teachings of the present disclosure is the use of different materials for power pins provided to the resistive element. The use of different materials for power pins in order to form temperature sensing or "thermocouple" power pins is described in U.S. Pat. No. 10,728,956 titled "RESISTIVE HEATER WITH TEMPERATURE SENSING POWER PINS," which is commonly owned with the present application and the contents of which are incorporated herein by reference in their entirety.

Figure 15A:
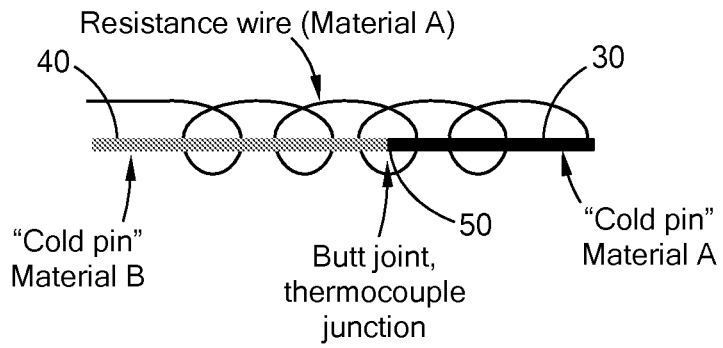
FIGS. 15A-15B are schematic illustrations of another form of a resistive element having a thermocouple power pin configuration and using a multi-point calibration according to the teachings of the present disclosure.
Figure 15B:
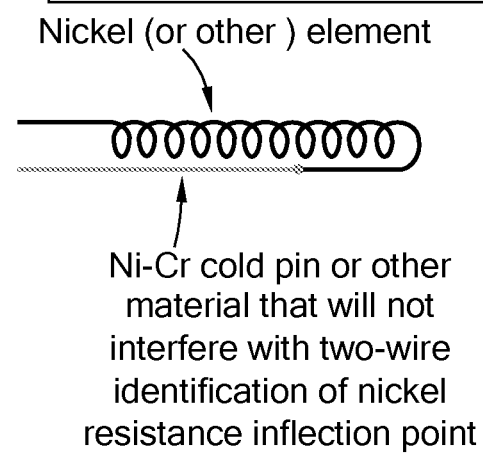

Referring to FIGS. 15A and 15B, two exemplary configurations of resistive elements having at least one power lead made of a different material are shown. The resistive element 30 (which in this case is a resistive wire of a heater) is made of a resistive material that has a measurable inflection point at its Curie temperature, such as, by way of example, Nickel 201 (UNS N02201), which has 99% Ni content. The power lead 40 is another material, but different than the material of resistive element 30, which could be, by way of example, a NiCr alloy. With the temperature measurement at junction 50, along with the inflection point at the Curie temperature for the Nickel 201, a multi-point calibration can be provided. One calibration point is from the Curie temperature inflection point, and the other calibration point is from the thermocouple power lead junction 50.

Advantageously, the teachings of the present disclosure can be used for a variety of purposes, including but not limited to calibrating resistance of a resistive element, compensating for thermal losses along a heating system, to calibrate thermal models, multi-point calibration, resistive element life prediction, and power control, among others.

In another form of the present disclosure, partial gain correction for the operational R-T curves is provided through the use of the second derivative of dR/dT, or $d^2R/dT^2$, and in other forms standard deviation or other mathematical representations of the shape of dR/dT. Generally, as described in greater detail below, the shape of the operational R-T curves leading up to and away from the Curie inflection point provide information for gain adjustment. And although a gain adjustment using the second derivative is illustrated and described below, it should be understood that the second derivative, along with other mathematical representations of the shape of dR/dT, may be used for either or both offset and gain while remaining within the scope of the present disclosure.

Figure 16A:
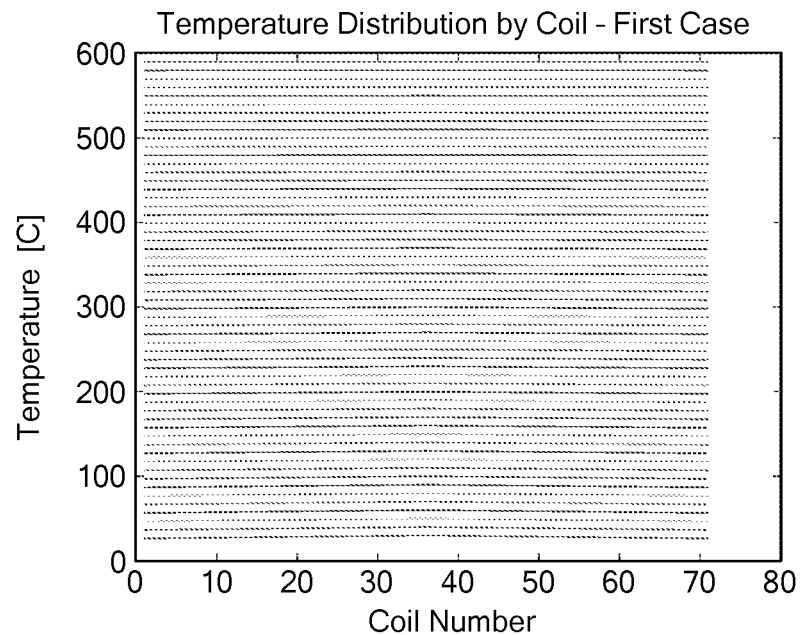
FIGS. 16A-16B are graphs illustrating simulated temperature distributions along a hypothetical heater having a number of coils, one with an isothermal temperature distribution and the other with high end losses, i.e., lower temperatures at both ends, and at different power levels according to the teachings of the present disclosure.
Figure 16B:
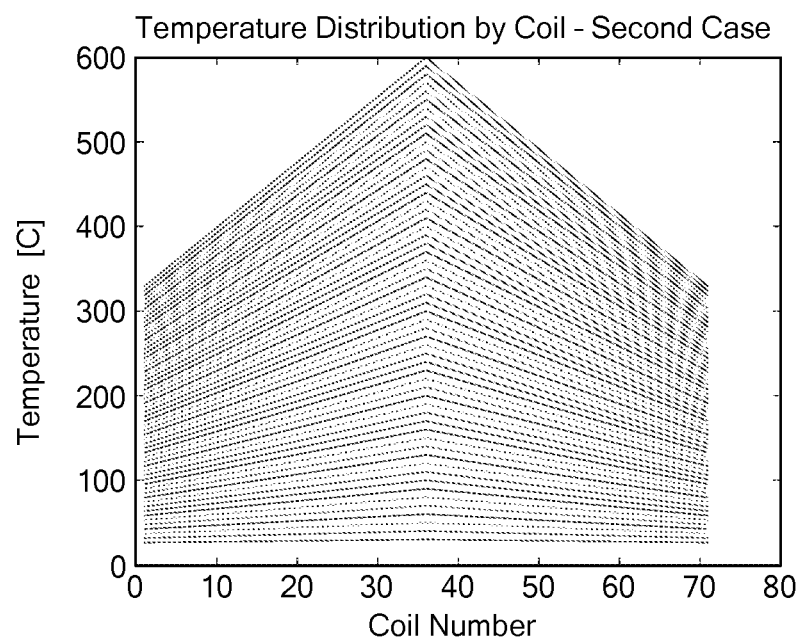

Referring to FIGS. 16A and 16B, simulated temperature distributions are illustrated for a heater having a plurality of coils (70 total coils in this example) at different power levels, with an isothermal temperature distribution shown in FIG. 16A and a condition with high end losses shown in FIG. 16B. Both the isothermal and high end loss conditions will be further analyzed using various mathematical representations of the shape of dR/dT as set forth in the following.

Figure 17:
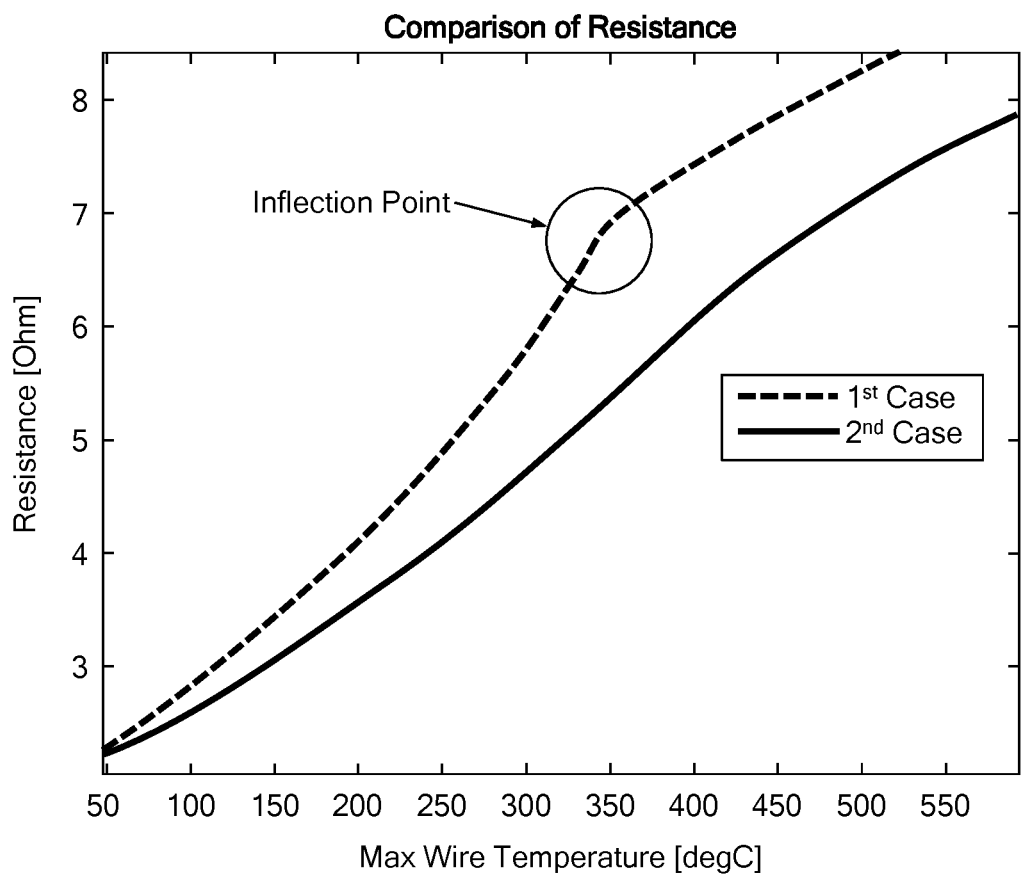
FIG. 17 is a graph of dR/dT curves for the hypothetical heater corresponding to FIGS. 16A and 16B according to the teachings of the present disclosure.

First, as shown in FIG. 17, the resistance for the isothermal condition is higher at the inflection point, which is more distinct. Additionally, the area under the R-T curve for the isothermal condition is greater than the high end loss condition.

Figure 18:
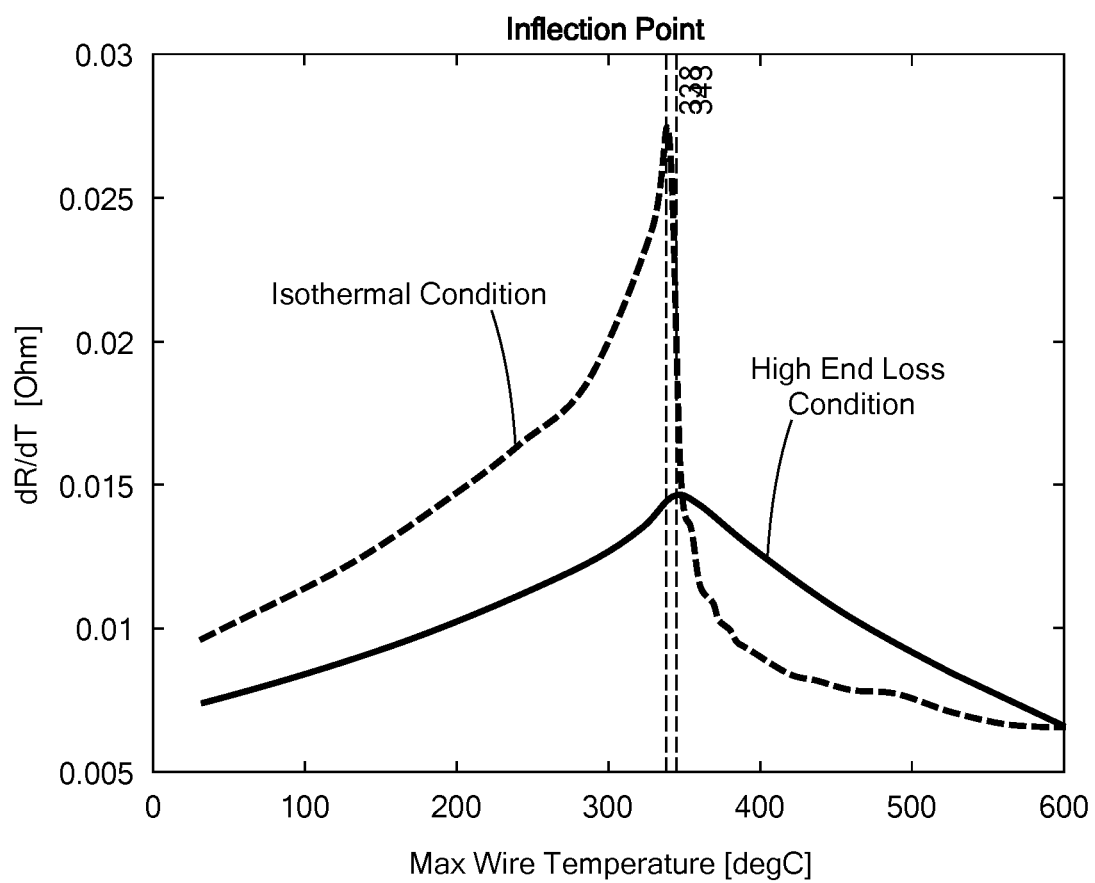
FIG. 18 is a graph of dR/dT versus a maximum wire temperature corresponding to FIGS. 16A and 16B according to the teachings of the present disclosure.

Now referring to FIG. 18, the maximum dR/dT for the isothermal condition is higher, and the standard deviation is also higher. The mean and standard deviation of the dR/dT values for each curve were calculated, and based on these calculations, the standard deviation of dR/dT for the isothermal condition was 0.0048, whereas the standard deviation of dR/dT for the high end loss condition was 0.0021. As further shown, the slope of the dR/dT curve for the isothermal condition is much higher going away from the inflection point (towards higher temperatures) than leading up to the inflection point, whereas the slopes of the dR/dT curve for the high end loss condition are similar. Accordingly, this difference indicates that a positive gain adjustment should be made to the high end loss condition to calibrate the heater to the isothermal condition. In other words, this information verifies that the heater with high end losses experiences lower average temperatures.

Figure 19:
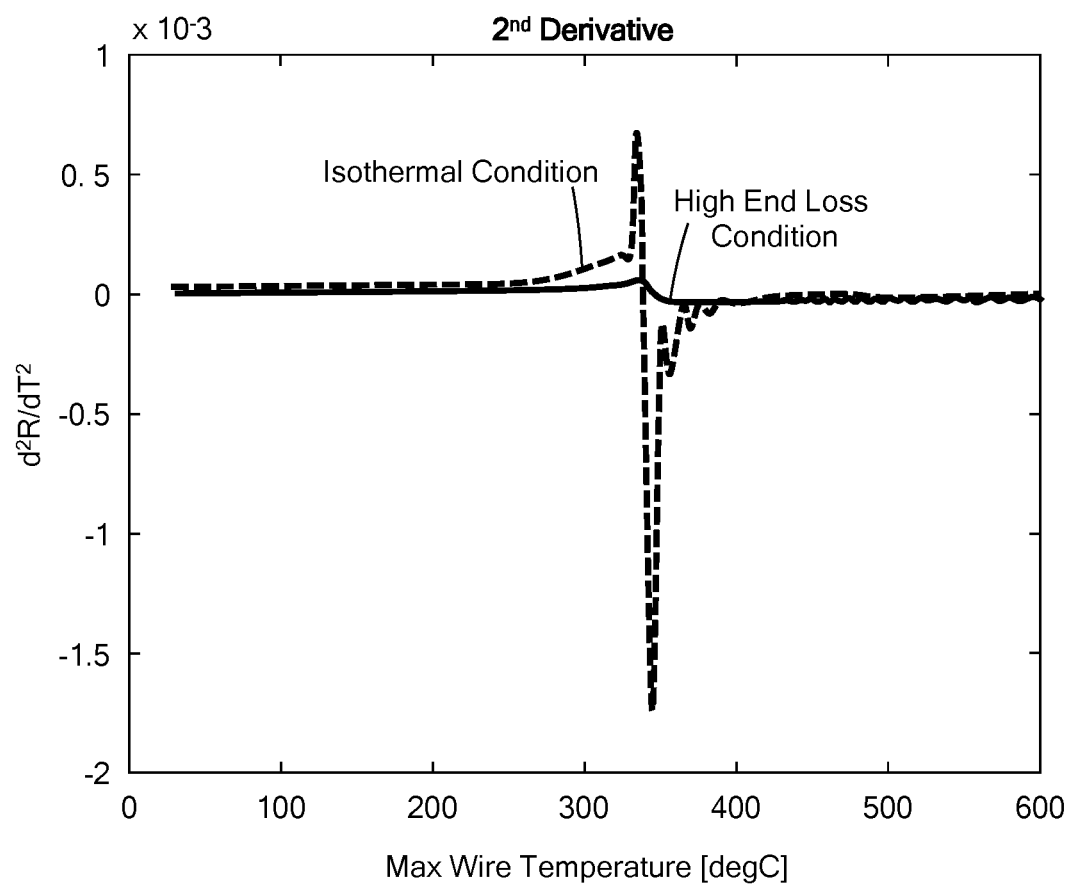
FIG. 19 is a graph of the second derivative, $d^2R/dT^2$ corresponding to FIGS. 16A and 16B according to the teachings of the present disclosure.

Turning next to FIG. 19, the second derivative, or $d^2R/dT^2$ is taken for both isothermal and high end loss conditions, which magnifies the Curie inflection point. The maximum and minimum values for $d^2R/dT^2$ are clearly higher and lower for the isothermal condition than for the high end loss condition, indicating the need for a gain adjustment. And similar to the dR/dT case illustrated and described above, the slopes of the $d^2R/dT^2$ curves leading up to and leading away from the inflection point can be used for gain adjustment.

Figure 20A:
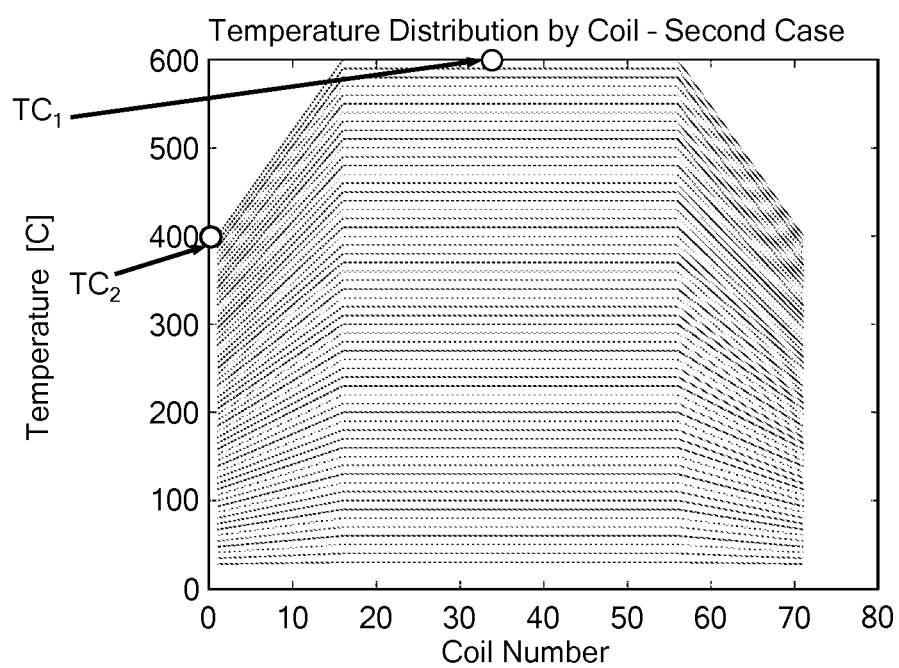
FIG. 20A is a graph illustrating simulated temperature distributions along a heater with thermocouples in two different locations according to the teachings of the present disclosure.
Figure 20B:
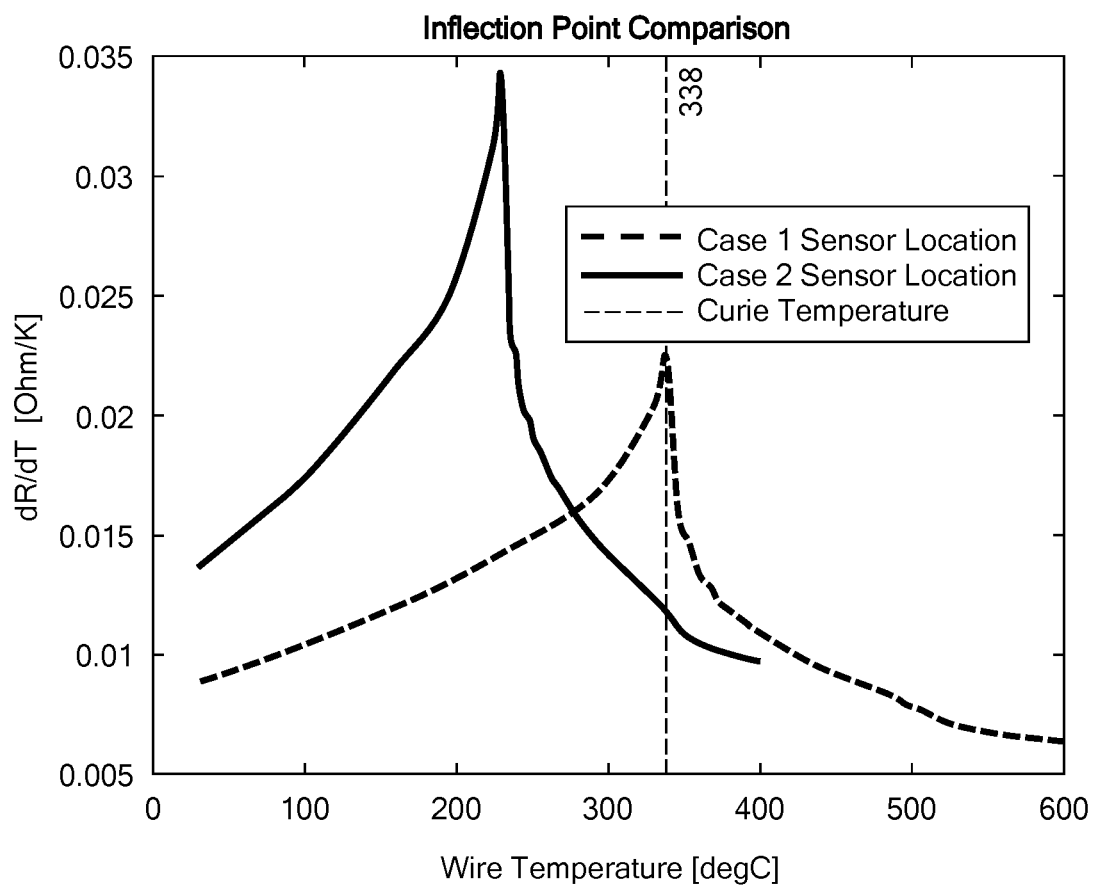
FIG. 20B is a graph of dR/dT versus wire temperature for two different thermocouple locations along the length of the hypothetical heater of FIGS. 16A and 16B according to the teachings of the present disclosure.

Referring to FIGS. 20A and 20B, the use of thermocouples in addition to adjusting of operational R-T curves based on the Curie inflection point as set forth above can provide additional calibration information. For example, a first thermocouple, $TC_1$, is placed near the hottest portion of a resistive heating element, and a second thermocouple, $TC_2$, is placed near the coldest portion of the resistive heating element. Since the resistive signal from both thermocouples is the same, and since the temperature of the second thermocouple $TC_2$ is lower, the values of dT are smaller and dR/dT is larger and shifted compared with the first thermocouple $TC_1$. With the second thermocouple $TC_2$, its inflection point is below the Curie temperature, thus indicating it is in a colder region. This inflection point can then be used to calibrate the second thermocouple $TC_2$.

Figure 21:
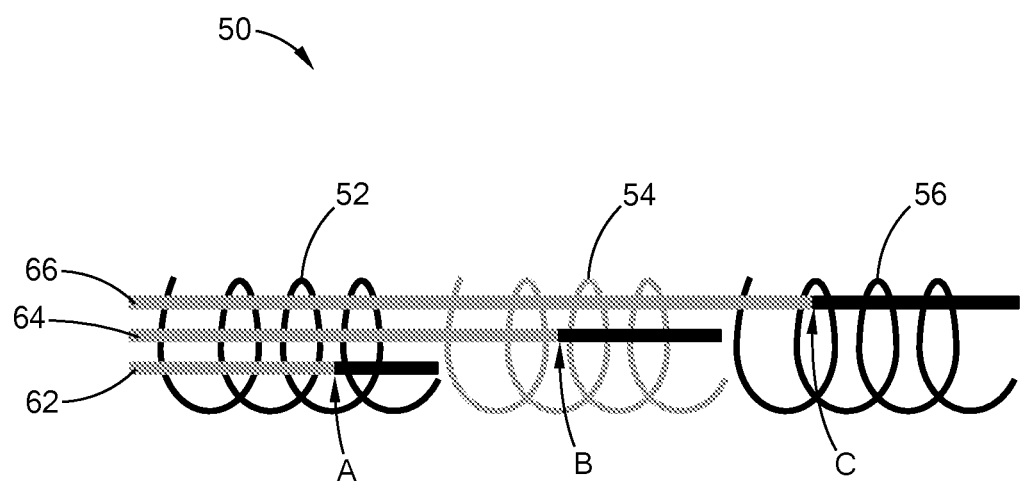
FIG. 21 is a schematic diagram of a heater having a plurality of different materials for resistive elements and multiple power lead sensor constructed in accordance with the teachings of the present disclosure.

Another variation of the present disclosure is shown in FIG. 21, which includes a multi-coil (or multi-segment, resistive element need not be in a coil shape as shown) heater 50, wherein each coil 52, 54, and 56 are made from different materials with different Curie temperatures, thus providing for temperature calibration according to the teachings herein. Additionally, each coil 52/54/56 may be connected to a power source with power leads 62, 64, 66 made from different materials than each coil 52/54/56, thus providing a temperature at each junction A/B/C for additional calibration purposes. Any number of coils, power leads, and materials may be used and combined in accordance with the principles of the present disclosure, and thus the illustration herein is merely exemplary and should not be construed as limiting the scope of the present disclosure.

Figure 22:
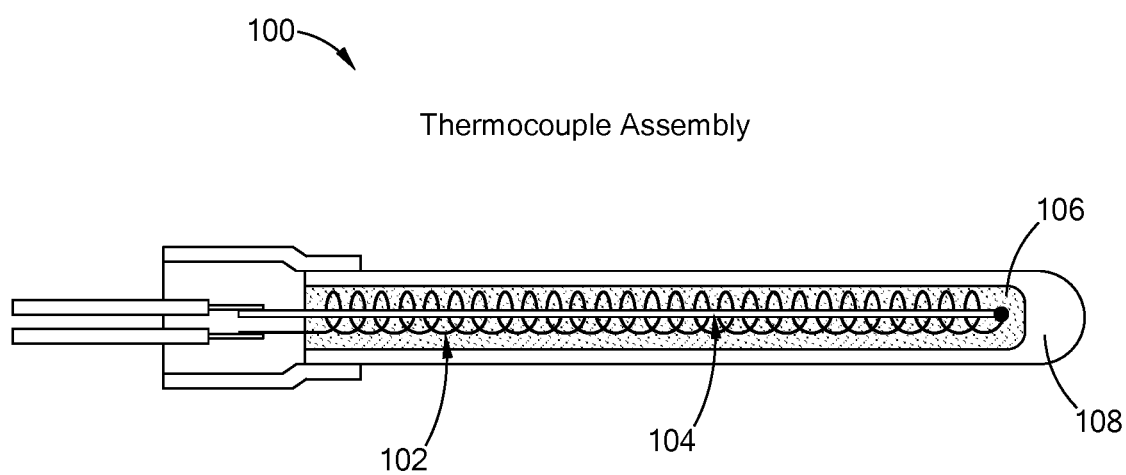
FIG. 22 is a schematic diagram of a self-calibrating thermocouple constructed in accordance with the teachings of the present disclosure.

Still another variation of the present disclosure is shown in FIG. 22, which is a self-calibrating thermocouple 100. The self-calibrating thermocouple 100 includes a first thermoelement 102 in the form of a coil for increased resistance, and a second thermoelement 104 made from a different material than the first thermoelement 102. Mineral insulation 106 surrounds the thermoelements 102/104, and a sheath 108 surrounds the mineral insulation 106 as is typical of many thermocouple constructions. The first thermoelement 102 is made of a material with a Curie temperature over the operational temperature range of the self-calibrating thermocouple 100. This Curie temperature can then be used to calibrate the self-calibrating thermocouple 100 in accordance with the teachings herein. It should also be understood that the specific thermocouple construction illustrated and described is merely exemplary, and other constructions are considered to be within the scope of the present disclosure. For example, a polymer insulation may be used instead of the mineral insulation 106, or the thermocouple junction may be exposed rather than being disposed within the sheath 108. These and other constructions should be construed as being within the scope of the present disclosure.

As set forth above, the teachings of the present disclosure and the use of the Curie inflection point can be used for a number of purposes. One such purpose is measurement/calculation of the temperature profile along the length of a heater (or sensor, or other resistive element) as shown in FIGS. 23A-23F. In this example, the "first case" is a condition with high end losses and the second case is an isothermal temperature distribution.

As described in greater detail below, this inflection point or calibrated R-T curve can be used for a variety of purposes, including but not limited to, predicting remaining life for a heater, measurement of the temperature profile along the length of a heater (or sensor, or other resistive element), identification of thermal losses from a heating system to improve system modeling and control, improvement in identification of the thermal path between the heating element and the process to improve system modeling and control, reduction of cost to calibrate thermal systems, self-calibration of heating systems, increased level of precision for combined two-wire resistance and thermocouple power pin (TCPP) thermal systems, two-wire thermocouple junction systems (to include other thermal systems having temperature sensing resistive/lead wires), and field re-calibration for sensing systems that change over time.

As used herein, the term "resistive element" should be construed to mean, for example, a resistive element for use in a heater, a resistive wire used in a thermocouple, or any other resistive element having a change in resistance over time to which the teachings of the present disclosure may be applied. Further, the heater may take any number of forms, including the tubular heater construction as shown herein, along with a cartridge heater, a cable heater, a layered heater, or a flexible heater, among others.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of measuring a temperature of a heater, the method comprising:
   generating a standard resistance-temperature (R-T) curve for a resistive element of the heater to identify values of the R-T curve and an inflection point at the Curie temperature, the standard R-T curve being generated when the resistive element is in isothermal conditions, the resistive element having an end joined to a power lead made of a material different from the material of the resistive element to form a thermocouple junction therebetween;
   generating operational R-T curves for the resistive element over an operational time period during a normal operation of the heater in which the resistive element is non- isothermal;
   comparing the standard R-T curve to the operational R-T curves; and
   adjusting the operational R-T curves to the standard curve at the Curie temperature to obtain adjusted operational R-T curves;
   measuring a temperature of the heater by the thermocouple junction;
   revising the temperature of the heater obtained by the thermocouple junction based on the adjusted operational R-T curves to obtain a revised temperature of the heater that compensates for a heat loss at the end of the resistive element.

2. The method according to claim 1, wherein the power lead is a NiCr material and the resistive element is a Ni material having at least 99% Ni content.

3. The method according to claim 1 further comprising applying an adjustment when a slope of the operational R-T curves is shallower than the slope of the standard R-T curve.

4. A method of measuring a temperature of a heater, the heater comprising a resistive element comprising a material with a Curie temperature, the resistive element including an end joined to at least one of power leads that has a material different from the material of the resistive element such that a thermocouple junction is formed between the resistive element and the at least one of the power leads for measuring the temperature of the heater, the method comprising:
   generating a standard resistance-temperature (R-T) curve for the resistive element of the heater to identify values of the R-T curve and an inflection point at the Curie temperature, the standard R-T curve being generated when the resistive element is in isothermal conditions;
   generating operational R-T curves for the resistive element over an operational time period during a normal operation of the heater in which the resistive element is non-isothermal due to a heat loss at the end of the resistive element;
   comparing the standard R-T curve to the operational R-T curves;
   adjusting the operational R-T curves to the standard R-T curve at the Curie temperature to obtain adjusted operational R-T curves;
   measuring the temperature of the heater by the thermocouple junction; and
   calculating a revised temperature of the resistive element based on the adjusted operational R-T curves and the temperature measured by the thermocouple junction to compensate for the heat loss at the end of the resistive element.

5. The method according to claim 4, wherein the power lead is a NiCr material and the resistive element is a Ni material having at least 99% Ni content.

6. A resistive heater comprising:
   a plurality of segments, each segment defining a different material from an adjacent segment, and each segment being made from a respective resistive material having a respective Curie temperature; and
   a plurality of power leads extending from a power source, each power lead being connected to one of the plurality of segments, each of the power leads comprising a material different from the material of the one of the plurality of segments that the respective power lead is connected to,
   wherein the Curie temperature of the plurality of segments and the different materials of the power leads are used to calibrate the resistive heater in accordance with the method of claim 4.

7. A method of measuring a temperature of a heater, the method comprising:
   generating a standard resistance-temperature (R-T) curve for the resistive element to identify values of the R-T curve and an inflection point at the Curie temperature, the standard R-T curve being generated when the resistive element is in isothermal conditions, the resistive element having an end joined to a power lead made of a material different from the material of the resistive element to form a thermocouple junction therebetween;
   generating operational R-T curves for the resistive element over an operational time period during a normal operation of the heater;
   developing mathematical representations of shapes of the R-T curves;
   adjusting the operational R-T curves to the standard curve at the Curie temperature based on the mathematical representations to obtain adjusted operational R-T curves;
   measuring the temperature of the heater by the thermocouple junction; and
   revising the temperature of the heater obtained by the thermocouple junction based on the adjusted operational R-T curves to obtain a revised temperature that compensates for a heat loss at the end of the resistive element.

8. The method according to claim 7, wherein the mathematical representations are second derivatives of the R-T curves.

9. The method according to claim 8, wherein the second derivatives are used for gain adjustment.

10. The method according to claim 7, wherein the mathematical representations are standard deviations between the operational R-T curves and the standard R-T curve.

\* \* \* \* \*